United States Patent
Jordan

(10) Patent No.: US 8,241,722 B2
(45) Date of Patent: Aug. 14, 2012

(54) MULTILAYER FILMS HAVING BREATHABLE REGIONS FOR USE IN BROADCAST FUMIGATION

(75) Inventor: **

MULTILAYER FILMS HAVING BREATHABLE REGIONS FOR USE IN BROADCAST FUMIGATION

CROSS-REFERENCE TO RELATED APPLICATIONS/INCORPORATION BY REFERENCE

This application makes reference to, claims priority to, and claims benefit of U.S. Provisional Application Ser. No. 61/113,080, filed Nov. 10, 2008, which application is incorporated herein by reference in its entirety.

FIELD OF THE INVENTION

The present technology generally relates to multilayer films having breathable regions which are suitable for use as broadcast fumigation films and for other applications. More particularly, the present technology relates to multilayer films comprising at least one breathable layer and at least one barrier layer, where the layers are arranged so that the multilayer film has at least one region, such as at the edge of the film, that is breathable throughout its thickness. The present technology also relates to methods of manufacturing and using such multilayer films.

BACKGROUND OF THE INVENTION

Broadcast fumigation films have been used in agriculture to confine chemical treatment agents, such as soil fumigants, to the areas where they are applied. Polyethylene materials have been used in the manufacture of such films. Polyethylene films are well suited for such use due to their ability to resist puncturing and tear propagation. However, polyethylene layers can be permeable to volatile gaseous compounds used for soil fumigation such as methyl bromide, chloropicrin, methyl iodide, dimethyl disulfide, and telone, among others. The escape of such fumigation compounds by passing through the broadcast fumigation film is undesirable.

Methyl bromide (MeBr) is an odorless, colorless gas that has been used in agriculture as a soil fumigant to control a wide variety of weeds and pests. However, MeBr is classified as a Class 1 ozone-depleting substance, and so there have been efforts to develop broadcast fumigation films that allow for lower MeBr usage rates per acre by more effectively confining the fumigant during the course of soil treatment.

One type of commercially available broadcast fumigation film is a virtually impermeable film (VIF). Such VIF's typically contain a nylon layer, which is known to have suitable barrier properties. Although commercial VIF's have suitable barrier properties and are not susceptible to barrier loss by weather or soil conditions, they are not as resistant to puncturing and tear propagation as polyethylene mulch films. As a result, nylon multilayer barrier films have had limited use in the agricultural industry despite nylon's suitable barrier properties.

Metalized polyethylene films have also been widely used as broadcast fumigation films. One such film is commercially available from Canslit, Inc., Montreal, Canada. With metalized films, a thin layer of aluminum or other metal is deposited on the film in a vacuum chamber. Such films are primarily polyolefin-based and consequently have excellent resistance to tearing, but their barrier properties are reduced as compared to a film containing a nylon barrier layer. Also, the metal layer can disintegrate or dissolve under a variety of soil and weather conditions. After this happens, the barrier properties of the metalized film are impaired or lost. Because the metalized film is opaque by design, it has the added disadvantage of impairing or preventing the applicator's view of an adhesive applied between adjoining films.

U.S. Patent Application Publication No. 20080044629 discloses mulch barrier films having, for example, a methyl bromide permeability of less than about 15 g/m$^2$-hr and machine direction Elmendorf tear strength of at least about 75 gm. The mulch barrier films are extruded, cast, and preferably embossed, multilayer films having at least one polyolefin layer and at least one polyamide layer.

U.S. Patent Application Publication No. 20080131676 discloses multilayer, microporous breathable barrier films and items such as laminates and garments made from such films. The films contain one or more layers of polymers without fillers in combination with at least two or more microporous breathable layers. The unfilled layers provide a barrier that can effectively allow moisture vapor to pass, but retain fluids and challenge materials.

BRIEF SUMMARY OF THE INVENTION

The present technology relates to multilayer films and methods of manufacturing and using such multilayer films, such as by using them as broadcast fumigation films. In one aspect of the present technology, multilayer films are provided which have at least one breathable layer extending the width of the film. The multilayer films also have at least one barrier layer extending less than the width of the film, and the breathable layer(s) and the barrier layer(s) are unified to form the multilayer film and arranged so that the multilayer film has at least one breathable region throughout the thickness of the film. Most or substantially all of the width of the multilayer film will be substantially impermeable to one or more soil fumigants, by virtue of the barrier layer of the multilayer film. These multilayer films can be joined to other films by placing these films on top of the other films and applying an adhesive under the breathable region. Because the region is breathable, the adhesive can dry and bond the films together.

In another aspect of the present technology, multilayer films are provided which have at least two outer layers comprising a polyolefin and one or more fillers. The outer layers are permeable to one or more volatile solvents. The multilayer films also have at least one inner layer comprising a polyamide, and the inner layer is substantially impermeable to one or more soil fumigants, such as methyl bromide, chloropicrin, methyl iodide, dimethyl disulfide, telone, derivatives thereof, or mixtures thereof. The multilayer films have a characteristic thickness and a width, and the outer layers have a width that is greater than a width of the inner layer. The inner layer is sandwiched between the outer layers such that the multilayer film has edges which are permeable to the volatile solvents through the thickness of multilayer film. This permits the volatile solvents, such as those used in adhesives, to escape through the breathable edges, thereby allowing an adhesive to dry and bond separate films together.

As yet another aspect of the present technology, methods are provided for preparing a field for broadcast fumigation. The methods comprise laying a first multilayer film on a field. The first multilayer film comprises a fumigant impermeable region and preferably one or more breathable regions at its edges. The methods also comprise laying a second multilayer film on the field, at least partially on top of a portion of the first multilayer film, so as to provide an overlap area. The second multilayer film comprises a fumigant impermeable region and a breathable region, and the breathable region is on top of the first multilayer film. The methods comprise, for example, applying an adhesive to one or both of the first multilayer film and the second multilayer film in the overlap area. The adhesive can be permeable or substantially impermeable to one or more soil fumigants. When the adhesive dries, it bonds the first and second multilayer films together, thereby providing a wider, fumigant impermeable covering over the field. The methods can also include laying a third multilayer film having a fumigant impermeable region and a breathable region on the field, such that the third multilayer film at least partially overlaps the first or second multilayer films to form another overlap area. The third multilayer film includes a breathable region in the overlap area, and an adhesive can be applied in the overlap area. The present methods can also include covering the field entirely with a plurality of bonded multilayer films, fumigating the field (before, during or after laying a multilayer film on the field), and removing the multilayer films after fumigation.

In various embodiments of the multilayer films and methods of the presently described technology, the barrier layer can have a width that is less than a width of the breathable layer, and the breathable layer and the barrier layer can be arranged so that a breathable region is at an edge of the multilayer film. Preferably the barrier layer has a permeability of less than about 15 $g/m^2$-hr to one or more of methyl bromide, chloropicrin, methyl iodide, dimethyl disulfide, telone, a derivative thereof, or a mixture thereof, among others. In some embodiments, the breathable region is at least 25% more permeable to methyl bromide than the barrier layer, as measured by ASTM739-99A. The breathable layer can include polyolefin and filler (such as a polyolefin selected from ethylene/1-hexene copolymers and ethylene/octene copolymers), and the barrier layer can include polyamide and can be substantially free of filler. The multilayer films may include a tie layer between a breathable layer and a barrier layer. The tie layer can have a width that is the same as or less than the width of at least one of the breathable layers. Alternatively or additionally, an adhesion promoting amount of tie resin can be incorporated into one or more of the breathable layers to promote adhesion between the barrier layer and breathable layer.

BRIEF DESCRIPTION OF SEVERAL VIEWS OF THE DRAWINGS

In FIGS. 1(b) and 1(c), a volatile portion of the adhesive evaporates through a breathable region of the top film.

DETAILED DESCRIPTION OF THE INVENTION

The presently described films are multilayer films comprising at least one breathable layer and at least one barrier layer, where the layers are arranged so that the multilayer film has at least one region that is breathable throughout its thickness. The present technology also relates to methods of manufacturing and using such multilayer films. Preferably the present films are multilayer laned coextruded films comprising one or more breathable layers of filled polymers or one or more barrier layers of unfilled polymers.

Thus, the present films and methods generally relate to multilayer films (such as a coextruded film) comprising at least two layers of breathable layers encapsulating one or more barrier layers. Preferably, the breathable layers comprise one or more fillers, preferably at a level of from about 0% to about 80% of the layer. The barrier layers preferably are substantially free of filler, other than minor amounts of filler that may be transferred from the breathable layer.

In certain preferred embodiments, the multilayer films comprise at least two outer layers of filled polymers and at least one inner layer of unfilled polymer, and the inner layer is encapsulated by the outer breathable layers. The inner layer is substantially impermeable to one or more soil fumigants, the present multilayer films are contemplated for use as coverings on agricultural fields (and other uses). The length of the multilayer films can be significant, such as hundreds or thousands of yards or meters, as it can be provided in large rolls and then unrolled to cover an agricultural field. Preferably, the present multilayer films have a thickness from about 0.5 mils to about 4.0 mils, alternatively from about 0.8 mils to about 1.2 mils, alternatively about 1 mil. Preferably, the widths of the multilayer films are from about 72 inches to about 156 inches, alternatively from about 96 inches to about 132 inches.

Figure 1A:
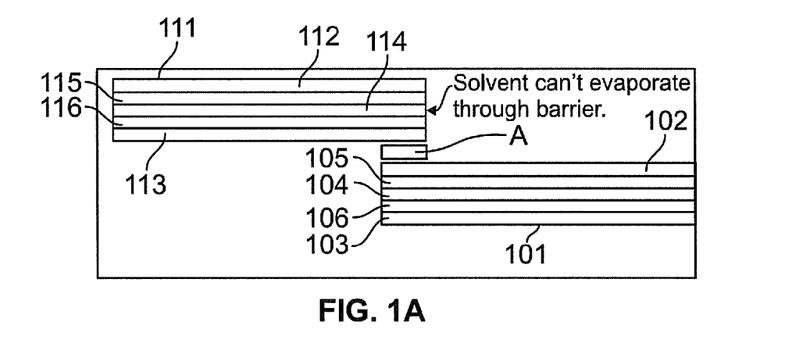
FIGS. 1(a), 1(b) and 1(c) shows two broadcast fumigation films being joined together using an adhesive.

Existing films used commercially for broadcast fumigation have included a barrier layer that is impermeable to one or more fumigants, along with skin layers. Separate sheets of multilayer films have been laid down in the field in such a way that the edges overlap. FIG. 1(a) shows how adhesives have been applied to some existing broadcast fumigation films. The edge of one film is glued over the edge of the film next to it, with a 6 to 12 inch overlap glue area, as shown in FIG. 1(a). However, it has been found that the glue between the two films does not dry to a suitable extent for bonding, perhaps because the solvents in the glue cannot pass through the top film. The barrier layer within the multilayer film prevents the glue solvent from diffusing out of the film, and the glue cannot properly set-up or cure in a reasonable amount of time. It also prevents oxygen or water vapor from entering to the glue site for those glues that require such gases to cure.

The present multilayer films address this issue by providing a breathable region through which an adhesive's solvent can escape, or through which oxygen or water can pass, thereby permitting the adhesive to dry and join separate multilayer films together. The preferred multilayer films comprise a barrier layer encapsulated within breathable layers, with the barrier layer encapsulated in the center of the web. For example, a breathable region measuring approximately two, four or six inches (or another width) on either side of the multilayer films does not contain the barrier layer. In this multilayer film, the width of the barrier layer is less than the width of the breathable layers, and the barrier layer and the breathable layers are arranged so that there are breathable regions at both edges of the multilayer film. Therefore the films can be laid and glued, as depicted in FIG. 1(b), so that the solvent can escape and the joined multilayer films provide a horizontally continuous barrier against the soil fumigant(s).

FIG. 1(a) shows two multilayer films having inner nylon layers that extend the entire width of the multilayer film. A first multilayer film 101 includes skin layers 102, 103 as its outermost layers. The multilayer film 101 also includes an inner nylon layer 104 which extends the entire width of the multilayer film 101. The skin layers 102, 103 are joined to the nylon layer 104 by tie layers 105, 106. A second multilayer film 111 is laid so that one of its edges overlaps with an edge of the first multilayer film 101. The second multilayer film 111 includes skin layers 112, 113, a nylon layer 114, and tie layers 115, 116 arranged in the same film structure as the first multilayer film 101. An adhesive A is applied in the overlap area between the first and second multilayer films 101, 111. The nylon layer 114 acts as a barrier to the volatile solvents present in adhesive A, and those solvents generally do not pass through nylon layer 114. As a result, adhesive A does not dry and does not provide adhesion between the first and second multilayer films.

Figure 1B:
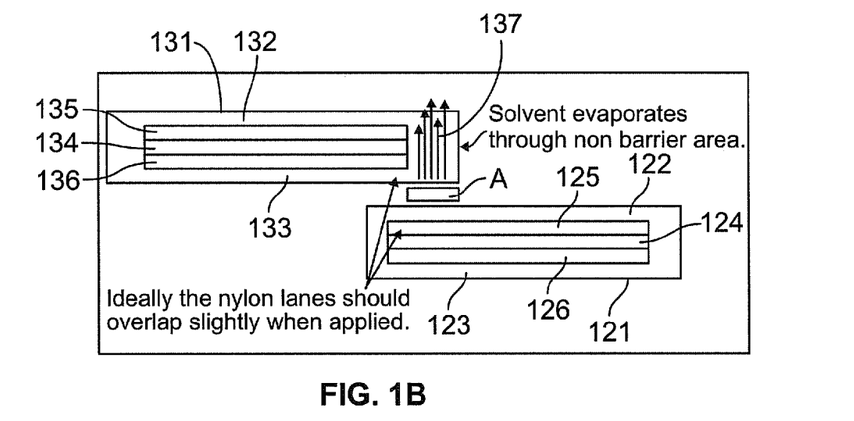

FIG. 1(b) shows an arrangement of the present multilayer films. A first multilayer film 121 includes at least one breathable layer provided as the outer surfaces 122 and 123 of the multilayer film 121. This at least one breathable layer can be provided as an integral layer that encapsulates the inner layers, or it can be provided as two separate layers that meet at the edges to encapsulate the inner layers. The multilayer film 121 includes an inner nylon layer 124 which serves as a fumigant impermeable barrier layer. A fumigant impermeable layer or region is one that is substantially impermeable to at least one fumigant. The inner nylon layer 124 is joined to the breathable layers 122, 123 by intermediate tie layers 125, 126 in this embodiment. A second multilayer film 131 is provided so that its edge overlaps the first multilayer film 121. The second multilayer film 131 also includes breathable layers 132, 133, an inner nylon layer 134, and intermediate tie layers 135 and 136, arranged in the same film structure as the multilayer film 121. Of course, it is contemplated that the second multilayer film 131 may have a different film structure than the first multilayer film 121. An adhesive A is applied in an overlap area between the first and second multilayer films 121 and 131. The overlap area includes a breathable region 137 of the second multilayer film 131. Adhesive A is applied in the overlap area, and solvents from adhesive A can evaporate through the breathable region 137 of the second multilayer film 131. Adhesive A is able to dry and bond the first and second multilayer films 121, 131 so that those films are joined together to form a wider barrier. In this embodiment, the multilayer films 121, 131 are arranged so that the overlap area encompasses a fumigant impermeable region of the first multilayer film 121. By this arrangement, a fumigant impermeable barrier is provided in the overlap area by virtue of the nylon layer 124 located in that overlap area.

Figure 1C:
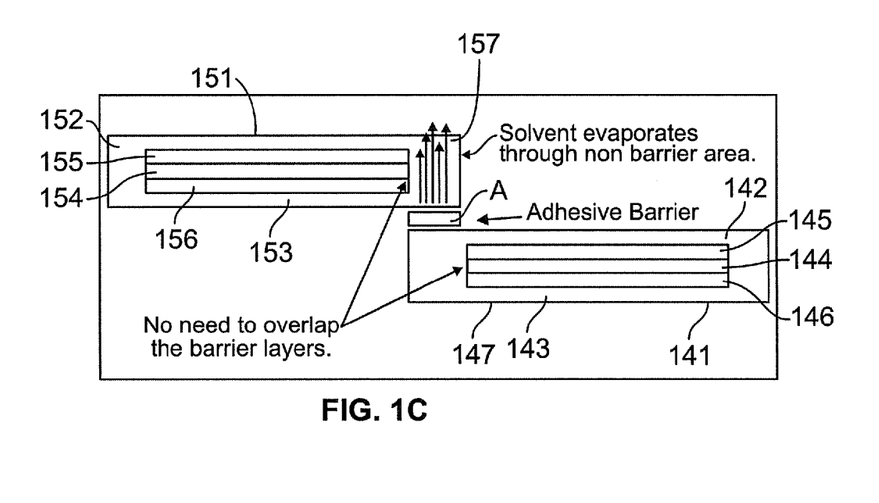

FIG. 1(c) shows an alternate arrangement of the present multilayer films and methods. In FIG. 1(c), a first multilayer film and a second multilayer film 131 include the same film structure as multilayer films 121, 131, in that they have one or more breathable layers 142, 143, 152, 153, inner nylon layers 144, 154, and intermediate tie layers 145, 146, 155, 156 that join the breathable layers and the nylon layers. In FIG. 1(c), adhesive A is provided in the overlap area between the first and second multilayer films 141, 151. Adhesive A is a barrier adhesive that is impermeable to one or more soil fumigants after drying. Because adhesive A provides a barrier to fumigants, the overlap area can include or be limited to the breathable regions 147, 157 of the first and second multilayer films 141, 151. The breathable regions 147, 157 are located at the edges of the films 141, 151. This arrangement has a reduced or minimal overlap area, since one need not include the inner nylon layer within the overlap area.

Figure 2:
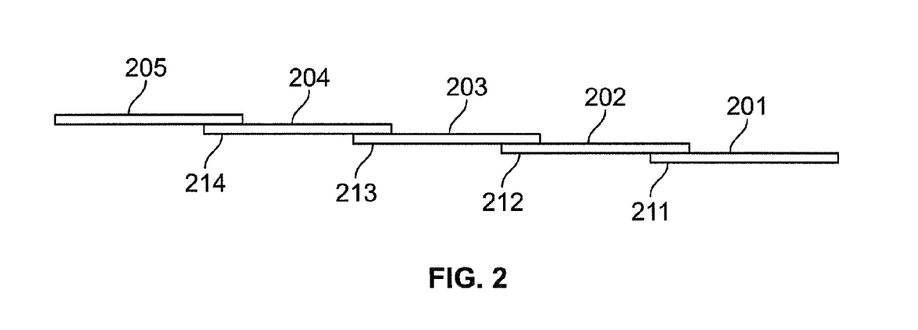
FIG. 2 demonstrates how separate lengths of a broadcast fumigation film can be overlapped to cover a field.

FIG. 2 demonstrates how separate lengths of a broadcast fumigation film can be overlapped to cover a field. Starting at one end of a field, a broadcast fumigation film is laid on a field that will be fumigated. In FIG. 2, the widths of the film extend horizontally on the page, and the length of the film extends into the page. The films can be provided in rolls, which are attached to tractors. Equipment and techniques for laying films from large rolls are available and known in the agricultural industry, and they can be used to unroll the film and apply an adhesive to a surface of the film, preferable at one edge of the film. As subsequent lengths of film are laid, each film is glued at the edge to the film next to it, so as to form a continuous sheet of barrier film that covers the entire field.

FIG. 2 shows how separate length or strips of broadcast fumigation films can be overlapped to cover an area that is larger in width than the widths of the individual films. A first broadcast fumigation film 201 is laid down on a field. A second broadcast fumigation film 202 is laid on the same field such that the edges of the first and second films 201, 202 form an overlap area 211. An adhesive is applied in the overlap area 211 so as to bond the first and second films 201, 202. A third film 203 is laid down next to the second film 202 in a manner such that the edges of the films overlap to form an overlap area 212. Again, an adhesive is applied between the films in the overlap area 212 so that the third film 203 is bonded to the second film 202. This method is repeated to lay down a fourth film 204 and a fifth film 205, where the fourth film 204 forms a third overlap area 213 with the third film 203, and the fifth film 205 forms an overlap area 214 with the fourth film 204. In this manner, a field can be covered with a broadcast fumigation film across its entire width.

The present methods can include applying adhesives in an overlap area between first and second multilayer films. The term adhesive refers to any adhesive, glue or bonding agent suitable for joining or bonding two films together. A preferred adhesive is S-5135 manufactured by Slocum Adhesives Corporation of Lynchburg, Va., also referred to as "red glue". The S-5135 adhesive contains hexane and acetone as volatile solvents, and the adhesive dries and bonds layers together when the solvents evaporate. It should be appreciated that the present technology can be used with a variety of bonding substances or techniques, such as bonding gels or melt bonding films together. The adhesives may be substantially permeable or substantially impermeable to one or more fumigants. For example, if a fumigant impermeable adhesive is desired, an adhesive material can contain a barrier material. The use of fumigant impermeable adhesives can provide a barrier in the seam between two overlapping multilayer films in the overlapping area. For example, PVdC latex can be mixed with an adhesive to form a seam that functions as a barrier to fumigants. PVdC latex is an aqueous emulsion of a copolymer, produced by emulsion polymerization of VDC (vinylidene chloride) and one or more other monomers. The use of a fumigant impermeable adhesive would allow for a reduced overlap area, in that the overlap area need not include the fumigant impermeable regions of the multilayer films, but rather can include only the breathable regions of the multilayer films.

The present films can include one or more breathable layers. The breathable layers within a multilayer film may be the same or different and may be formed from at least one polyolefin-based polymer. Examples of suitable polyolefin-based polymers include low density polyethylene (LDPE), linear low density polyethylene (LLDPE), high density polyethylene (HDPE), polypropylene (PP), propylene ethylene copolymers, alpha-olefin copolymers, blends thereof, and mixtures thereof. Suitable examples of LLDPE for use in the breathable layers include ethylene/1-hexene copolymers (commercially available as Dow 5630A Hexene) and ethylene/octene copolymers (commercially available as Dow 5230G Octene). Preferably, the present multilayer films comprise at least two breathable layers comprising polyolefin and inorganic or organic filler, and the breathable layers encapsulate a barrier layer which is substantially centered in the multilayer film. The filler is dispersed in the polyolefin matrix and is included at levels from about 0.0% to about 80% by weight. The filler can be comprised of calcium carbonate, diatomaceous earth, barium sulfate, talc, glass spheres, starch, and many other organic or inorganic particles, or blends thereof. The breathable layers can comprise from about 75% to about 99.5% of the total thickness of the film. The breathable layers can differ from each other in thickness, breathability, pore size, and thermoplastic composition. In addition to the fillers, other additives may be included in one or more of the breathable layers to aid in the manufacture of the layers or for additional properties. For example, the breathable layer(s) can comprise one or more additives such as UV stabilizing agents, pigments, insect repellents, antimicrobials, or antioxidants. Various additives that may be suitable for inclusion in one or more layers of the present multilayer films can be found in U.S. Pat. App. Publication No. 20070231576 and elsewhere.

The barrier layer(s) can be an essentially unfilled polymer. The barrier layer(s) can be any material that is substantially impermeable to one or more broadcast fumigants, such as methyl bromide, chloropicrin, methyl iodide, dimethyl disulfide, telone, derivatives thereof, and mixtures thereof. Preferably the barrier layer(s) comprise a polyamide resin which can be a polyamide, such as nylon 6, or a polyamide copolymer. Suitable examples of polyamide copolymers for use herein include nylon 6/66, which is a copolymer of nylon 66 and nylon 6 made with hexamethylene diamine, adipic acid and caprolactam; nylon 6/12, which is a copolymer of nylon 6 and nylon 12; nylon 6/69; and mixtures of such polyamide copolymers. In the present multilayer films, one or more barrier layers preferably make up from about 0.5% to about 50% of the total thickness of the film and/or from about 25.0% to about 99.8% of the width of the multilayer film. Preferably the barrier layer does not contain fillers that provide sites for micropores, although additives for other purposes may be used. Additives may be added for additional properties, such as antimicrobial effects, ultraviolet stability, and pigmentation. Other materials for these layers include, but are not limited to, LLDPE, LDPE, HDPE, nylon, ethylene vinyl alcohol copolymers (EVA), polyvinylidene chloride (PVdC), ethylene-acrylic acid copolymers (EAA), ethylene methacrylic acid copolymers (EMA), polypropylene (PP), copolymers of PP, copolymers of PE and PP, polyurethane, and blends thereof. The barrier layer(s) of the present multilayer films can be internal barrier layer(s), placed in the film to impede the flow of fumigation gasses which are used to sterilize the soil.

One or more barrier layers may be incorporated into the present multilayer film and can be placed in any order among the inner layers of the film. Alternatively or additionally, one or more barrier layers can be placed on the outer surface of the film, but care must be taken to avoid curling of the web as the various layers cool at different rates. A barrier layer can be cast, printed or laminated on a portion of the outer surface of a breathable layer. For better effectiveness, it is preferred that multiple barrier layers are not placed next to each other inside the film. Barrier layers can differ from each other in thickness and thermoplastic type. For example, a different thermoplastic may be used in different barrier layers to increase internal layer adhesion. It is also preferable to add components to the barrier layer in order to more easily measure the layer thickness accurately. Components include, but are not limited to, optical brighteners, infrared markers, EVA, EMA, pigments, and blends thereof. In some embodiments of the present multilayer films, the barrier layer has a different infrared signature than the breathable layers in the films.

The breathable layers can be from about 50% to about 99.5% of the thickness of the multilayer film, preferably from about 75% to about 99.5%. The barrier layer can comprise from about 0.5% to about 50% of the total film structure. More preferably, the barrier layer comprises from about 5% to about 20% of the total film structure.

The multilayer films may comprise one or more tie layers disposed between a barrier layer and a breathable layer, to provide or to improve the adhesion between those layers. Such tie layers can be formed from compositions known to promote adhesion between separate layers. Suitable materials for the tie layers include maleic anhydride grafted polymers, such as those sold by DuPont under the trade name BYNEL® or those sold by Equity under the trade name PLEXAR®. The tie layers can be between about 1% and about 30% of the total film thickness. Alternatively, the polyolefin breathable layers may include an amount of a tie resin to aid in direct bonding of a nylon barrier layer to the polyolefin breathable layer. A suitable amount of tie resin incorporated into a polyolefin layer is an adhesion promoting amount that is sufficient to adhere the barrier layer to the polyolefin breathable layers without allowing the layers to separate.

As mentioned above, one or more additives can be added to one or more of the layers of the multilayer films. Such additives include, but are not limited to, processing aids, lubricants, stabilizers, antiblocking agents, antistatics, color concentrates, slip agents, ultraviolet light inhibitors, antioxidants, derivatives thereof, and combinations thereof.

Figure 3:
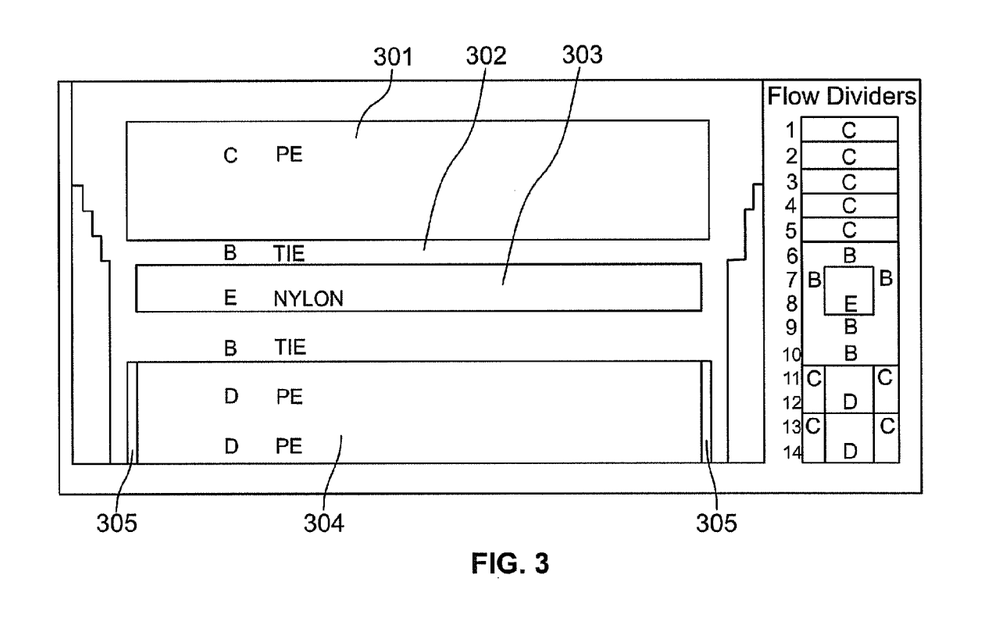
FIG. 3 shows a die and feedblock configuration for preparing a multilayer film in accordance with at least one embodiment of the present technology.

For some embodiments of the present multilayer films, a preferred structure contains five layers, with one barrier layer being in the core of the structure and four breathable layers, in an C-B-E-B-D structure for the resultant multilayer film, wherein B refers to a breathable layer that includes an amount of tie resin, C refers to a different kind of breathable layer, D refers to a third kind of breathable layer which includes a colorant, and E refers to the barrier layer. FIG. 3 illustrates a more detailed arrangement of these different materials, and a suitable manufacturing method for such a film, viewed as the output from a coextrusion process. The outermost breathable layers (C and D) contain LLD/LD polyethylene with optional UV inhibitors, antioxidants, CaCO$_3$, slip agents, colorants, and processing aids. The inner breathable layers (B and B) contain LLDPE/LDPE/Bynel with optional UV Inhibitors, antioxidants, CaCO$_3$, slip agents, and processing aids. The inner barrier layer (E) contains Nylon/Selar with optional colorant. For example, a multilayer C-B-E-B-D film is contemplated having a yellow colorant in the B tie layers and a blue colorant in the E nylon layer. The inclusion of these colorants creates a green center lane in the multilayer film, and provides a capacity for detecting where the fumigation impermeable region of the film layers is. This can provide an advantage in the use of the multilayer films, in that a user can see where the breathable regions are located, which facilitates use in the field and application of the adhesive to the breathable regions. The inclusion of colorants in the tie layer and/or the barrier layer also provides a manufacturing advantage, in that it can permit the manufacturer to more easily see any changes in the layers due to fluctuating pressures or temperatures. Further, other structures are contemplated which utilize different levels of CaCO$_3$ as well as other filler materials in the breathable layers and different polymers in the breathable and barrier layers.

The presently described technology is not limited to any specific film structure. Other film structures can achieve the same or similar results as the five-layer structure disclosed above. The film structure may be a function of equipment design and capability. For example, the number of layers in a multilayer film can depend on the technology available and the desired end uses of the film.

Other film structures are contemplated which may achieve the desired result. As mentioned above, the barrier layer can be held in place by adhesive compounds like Bynel Concentrate that can eliminate the need for specific tie layers. Some of the contemplated film structures include the following (where C is a breathable layer and E is a barrier layer):
CEC
CCEC
CCECC
CECEC
CCCEC
CECECC
CCCECCC and so on.

It is also anticipated that the "C" breathable layers in the above structures could be comprised of two or more breathable layers in order to better control other film properties, such as to allow the adhesive to dry. In the case of the two breathable layers the foregoing film structures would become as follows, where D is the second breathable layer:
CDEDC
CDCDEDC
CDEDCDC
CDEDEDC and so on.

Additionally, there is known die technology available to multiply layers so that, for example an CEC structure could conceivably be multiplied from about 10 to 200 times, as explained in U.S. Pat. No. 5,380,479 to Shrenk, et al. For example, a 10 time multiplied film structure would be as follows:
CECCECCECCECCECCECCECCECCEC
This die technology can be used with the present manufacturing methods to produce the present multilayer films.

The multilayer films of the present technology have an fumigant impermeable region. Preferably, this region is almost the entire width of the multilayer film, except for the breathable regions. The fumigant impermeable region is substantially impermeable to one or more soil fumigants, or it has a permeability to one or more soil fumigants that is less than about 15 g/m$^2$-hr. Preferably, the fumigant impermeable regions have a permeability that is less than about 10 g/m$^2$-hr, alternatively less than about 5 g/m$^2$-hr, to one or more soil fumigants. For example, the fumigant impermeable region may have a permeability of less than about 15 g/m$^2$-hr, or less than about 10 g/m$^2$-hr, or less than about 5 g/m$^2$-hr, for methyl bromide, chloropicrin, methyl iodide, dimethyl disulfide, telone, mixtures thereof, derivatives thereof, or for some or all of the foregoing. Preferably, the fumigant impermeable region is substantially impermeable to each of the foregoing fumigants.

The multilayer films can be manufactured by a variety of known film processing techniques (lamination, coextrusion, and the like). For example, in a lamination process, discrete layers of breathable and barrier materials may be laminated together to arrive at a finished multilayer film. As another example, a barrier layer can be printed on a portion of the outer surface of a breathable layer. More preferably, the present multilayer films are produced by a coextrusion process, in which melted and plasticized streams of individual materials are fed into a coextrusion die. While in the die, the layers are juxtaposed and combined in separate layers and/or as separate lanes which form a layer, after which they emerge from the die in a single multilayer film.

Cast extrusion processes can be employed to manufacture the present multilayer films, as they can provide a film that has high tear strength, especially in the machine direction. Examples and discussion of cast extrusion processes are found in Sabbagh, U.S. Patent Application Publication No. 20080044629. Such cast films have machine direction (MD) and transverse direction (TD) tear strengths that are more closely balanced to each other compared to the MD and TD tear strengths observed with blown films comprising a nylon layer.

In a cast extrusion process of the present technology, individual layer materials are introduced into an extruder where they are melted and plasticized. Suitable extruder barrel temperatures include from about 300° to about 500° F., depending upon the amounts and types of materials introduced. The melted and plasticized streams are then fed into a coextrusion feedblock and die. The coextrusion die may be, for example, a multimanifold die or a feedblock and single manifold die. A feedblock can include a plurality of input slots for receiving one or more extrudable materials, and an interior manifold that can be adjusted by inserting one or more flow dividers or flow plates into the feedblock. The flow dividers can be used to maintain separation between materials fed into separate input slots of the feedblock and direct the layers so they will be particular widths when they enter the die. Accordingly, flow dividers can be machined so that they provide a desired thickness of material and/or to direct the flow of materials fed to the feedblock. For example, one flow plate can be used to direct flow of a first material to the edges of the feedblock while an adjacent flow plate directs a second material to the center, so that the first and second materials will combine to form a single layer having different lanes of the first and second materials. The output end of the feedblock is fed through a die. The die produces a continuous multilayer film. Any die suitable for use in the present technology may be used. The flexible die lip, which defines the thickness of die opening, can be adjusted (increasing or reducing slot thickness) by means of a series of adjustable die bolts or screws. The multilayer film exiting the die is then processed, if desirable, such as by drawing, and fed to a roll. Suitable temperatures for the coextrusion die include from 350° to about 550° F. While in the die, the layers are juxtaposed and combined, after which they emerge from the die in a single multilayer molten film. As the molten film is extruded from the die lip, it drops down into a nip between two casting rolls. The casting rolls are typically water cooled or heated. Suitable temperatures for the casting rolls include from about 50° F. to about 130° F., alternatively from about 70° F. to about 100° F. As the molten film travels through the nip, it is cooled and forms a multilayer cast film.

FIG. 3 provides an illustration of a die and feedblock configuration for making an embodiment of the present multilayer film. On the left side, the general film structure of the multilayer film emerging from the die is illustrated, though it is not intended to be drawn to scale. On the right side, the arrangement of flow dividers in the feedblock is illustrated. Both the left and right sides (die and feedblock) in FIG. 3 generally illustrate the thickness dimension of the multilayer film structure vertically, and show the width dimension (side-to-side arrangement) of the film horizontally, though not drawn to scale. The multilayer film illustrated in FIG. 3 has a C-B-E-B-D structure similar to that described above. The C layer 301 is a breathable layer of a polyethylene (PE) based material, such as polyethylene homopolymer or a polyethylene copolymer. The B layer 302 is a breathable layer that includes an amount of tie resin, and it encapsulates a nylon E layer 303, providing lanes of B material at the edges of the E material. The edges of the B layer 302 are breathable and constitute part of the breathable region of this multilayer film. Another breathable D layer 304 is provided, which includes a colorant, and lanes 305 of the C breathable material are included in the layer with the D material 304, to promote a different color for the edges. FIG. 3 illustrates separate lanes of barrier material E and tie material B in the interior of the film, as well as separate lanes of C and D materials in the breathable layers.

In practicing the present methods of manufacture, particularly in the use of a coextrusion process, various empirical adjustments to the feedblock and die may be useful to produce a multilayer film having an encapsulated nylon layer. Suitable adjustments of the flow of material from extruders (such as by downgauging the flow of material or changing the rate or amount of material from the extruder into the feedblock) and of die pressure can be made on an empirical basis. It was found desirable to cut flow plates for the nylon polymer to dimensions of 80% of the die width in order to produce a nylon layer of 95% of the usable web width in a final multilayer film.

It is contemplated that the present multilayer films can be prepared using any suitable technology for coextrusion, particularly technology for encapsulating one or more extruded layers within other extruded materials. Additional information regarding the encapsulation of an extruded material can be found, for example, U.S. Pat. App. Publication No. 2003/0087057; U.S. Pat. No. 5,106,562; and U.S. Pat. No. 5,108,844.

The present multilayer films can be employed for any use where it is desirable to join two separate films by gluing them together to form a larger covering that is impermeable to one or more fumigants or other agents. For example, the present multilayer films can be used in broadcast fumigation, and the present technology relates to methods of preparing a field for broadcast fumigation. The present methods comprise laying a first multilayer film on a field. The first multilayer film includes a fumigant impermeable region. The present methods also comprise laying a second multilayer film on the field, at least partially on top of a portion of the first multilayer film, so as to provide an overlap area. The second multilayer film has a fumigant impermeable region and a breathable region, and it is laid so that its breathable region is on top of the first multilayer film. The methods also comprise applying an adhesive to the first multilayer film and/or to the second multilayer film in the overlap area. The adhesive can be applied before and/or after the second multilayer film is laid on the first multilayer film. The adhesive dries and bonds the first and second multilayer films together. Volatile solvent in the adhesive evaporates through the breathable region of the second multilayer film, resulting in drying and bonding. The present methods can include laying third, fourth, and additional multilayer films having fumigant impermeable regions and breathable regions on a field and at least partially overlapping the first or second multilayer films to form overlap areas, wherein the top film of each overlap area includes a breathable regions. The present methods also comprise applying adhesive between overlapping portions of the multilayer films. The present methods also can comprise covering the field partially or entirely with a plurality of bonded multilayer films. The present methods can include fumigating the covered field, and removing the multilayer films after fumigation.

In the present specification, use of the singular includes the plural except where specifically indicated. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (meaning "including, but not limited to,") unless otherwise noted. Whenever the term "about" appears before a value, it should be understood that the specification is also providing a description of that value apart from the term "about", and vise versa. Wherever an open-ended term is used to describe a feature or element of the invention, it is specifically contemplated that a closed-ended term ("consisting of" or "consisting essentially of") can be used in place of the open-ended term without departing from the spirit and scope of the invention. Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

In the present specification, any of the functions recited herein may be performed by one or more means for performing such functions. With respect to the methods described in the specification, it is intended that the specification also provides a description of the products of those methods. With respect to the materials, equipment, and combinations described in the specification, it is intended that the specification also provides a description of the components, parts, portions, of such compositions and combinations.

All of the references cited herein, including patents, patent applications, and publications, are hereby incorporated in their entireties by reference. Although the dependent claims have single dependencies in accordance with U.S. patent practice, each of the features in any of the dependent claims can be combined with each of the features of other dependent claims or the main claim.

The invention claimed is:

1. A multilayer film having a thickness and a width, the film comprising:
    at least one soil fumigant permeable layer extending the width of the film; and
    at least one barrier layer extending less than the width of the film, and said at least one soil fumigant permeable layer and said at least one barrier layer are unified to form the multilayer film; wherein, the multilayer film has at least one soil fumigant permeable region throughout the thickness of the film and the multilayer film is on top of and covers an agricultural field.

2. The multilayer film of claim 1, wherein
    the at least one barrier layer has a width that is less than a width of the soil fumigant permeable layer,
    the soil fumigant permeable layer and the barrier layer are arranged so that said at least one soil fumigant permeable region is at an edge of the multilayer film, and
    the multilayer film has a width of about 72 inches to about 156 inches.

3. The multilayer film of claim 2, wherein the at least one soil fumigant permeable layer extending the width of the film and at least one barrier layer extending less than the width of the film are arranged so that said at least one soil fumigant permeable region at the edge of the multilayer film measures between about two and about six inches.

4. The multilayer film of claim 1,
    wherein, the multilayer film has at least one breathable region throughout the thickness of the film and the multilayer film is configured for covering an agricultural field and wherein the at least one breathable layer comprises polyolefin and filler, and the at least one barrier layer comprises polyamide and is substantially free of filler.

5. The multilayer film of claim 4, wherein the polyolefin is an ethylene/1-hexene copolymer or an ethylene/octene copolymer.

6. The multilayer film of claim 1, wherein said at least one barrier layer has a different infrared signature than said at least one soil fumigant permeable layer.

7. The multilayer film of claim 1, wherein the at least one barrier layer is printed or laminated on a portion of the at least one soil fumigant permeable layer.

8. The multilayer film of claim 1, wherein an adhesion-promoting amount of tie resin is incorporated into the at least one soil fumigant permeable layer to promote adhesion between the at least one barrier layer and the at least one soil fumigant permeable layer.

9. The multilayer film of claim 1, wherein at least one tie layer is interposed between the at least one soil fumigant permeable layer and the at least one barrier layer, wherein the at least one tie layer has a width that is less than the width of the at least one soil fumigant permeable layer.

10. The multilayer film of claim 1, wherein the width of the at least one barrier layer is from about 25.0% to about 99.8% of the width of the multilayer film.

11. The multilayer film of claim 1, wherein the at least one barrier layer comprises from about 0.5% to about 50% of the total thickness of the multilayer film.

12. The multilayer film of claim 1, wherein the multilayer film has a total thickness of about 0.8 mils to about 4.0 mils.

13. A multilayer film having a thickness and a width, the film comprising:
    at least one breathable layer extending the width of the film;
    at least one barrier layer extending less than the width of the film, and said at least one breathable layer and said at least one barrier layer are unified to form the multilayer film;
    wherein, the multilayer film has at least one breathable region throughout the thickness of the film and the multilayer film is configured for covering an agricultural field and wherein the at least one barrier layer comprises polyamide providing a permeability of less than about 15 g/m$^2$-hr to one or more of methyl bromide, chloropicrin, methyl iodide, dimethyl disulfide, telone, a derivative thereof, or a mixture thereof.

14. A multilayer film having a thickness and a width, the film comprising:
    at least one breathable layer extending the width of the film;
    at least one barrier layer extending less than the width of the film, and said at least one breathable layer and said at least one barrier layer are unified to form the multilayer film;
    wherein, the multilayer film has at least one breathable region throughout the thickness of the film and the multilayer film is configured for covering an agricultural field and wherein
    the at least one breathable region is at least 25% more permeable to methyl bromide than the at least one barrier layer, as measured by ASTM739-99A and the breathable region provides means for an adhesive's solvent escaping from between two overlapping multilayer films adhered together with an adhesive carried by the adhesive's solvent so that multiple multilayer films are adhered together to cover the agricultural field.

15. A multilayer film having a thickness and a width comprising:
    at least two outer layers comprising a polyolefin and one or more fillers, wherein the outer layer is permeable to one or more volatile solvents;
    at least one inner layer comprising a polyamide, wherein the inner layer is substantially impermeable to one or more fumigants selected from the group consisting of methyl bromide, chloropicrin, methyl iodide, dimethyl disulfide, telone, derivatives thereof, and mixtures thereof;
    wherein the outer layers have a width that is greater than a width of the inner layer, and the inner layer is coextruded between the outer layers such that the multilayer film has edges which are permeable to said one or more volatile solvents through the thickness of the multilayer film and
    wherein the multilayer film is configured for covering an agricultural field.

16. A method of preparing a field for broadcast fumigation comprising:
    laying a first multilayer film on a field, wherein the first multilayer film comprises a fumigant impermeable region;
    laying a second multilayer film on the field, at least partially on top of a portion of the first multilayer film, so as to provide an overlap area, wherein the second multilayer film comprises a fumigant impermeable region and a breathable region, and said breathable region is on top of said first multilayer film; and
    applying an adhesive to one or both of said first multilayer film and said second multilayer film in the overlap area, wherein the breathable region provides means for the adhesive's solvent to escape from the overlap area.

17. The method of claim 16, further comprising laying a third multilayer film having a fumigant impermeable region and a breathable region on the field, such that the third multilayer film at least partially overlaps the first or second multilayer films to form overlap areas, wherein the third multilayer film includes a breathable portion in the overlap area.

18. The method of claim 16, further comprising covering the field entirely with a plurality of bonded multilayer films.

19. The method of claim 18, further comprising fumigating the field, and removing the multilayer films after fumigation.

20. The method of claim 16, wherein the adhesive is substantially impermeable to one or more fumigants.

21. A multilayer film having a thickness and a width, the film comprising:
    at least one soil fumigant permeable layer extending the width of the film; and
    at least one barrier layer extending less than the width of the film, and said at least one soil fumigant permeable layer and said at least one barrier layer are unified to form the multilayer film; wherein, the multilayer film has at least one soil fumigant permeable region throughout the thickness of the film and the multilayer film is on top of and covers an agricultural field with the multilayer film arranged so that said at least one barrier layer covers an area of the agricultural field that is not to be fumigated and said at least one soil fumigant permeable layer covers an area of the agricultural field that is to be fumigated.

22. A multilayer film having a thickness and a width, the film comprising:
    at least one soil fumigant permeable layer extending the width of the film; and
    at least one barrier layer extending less than the width of the film, and said at least one soil fumigant permeable layer and said at least one barrier layer are unified to form the multilayer film; wherein, the multilayer film has at least one soil fumigant permeable region throughout the thickness of the film and the multilayer film is on top of and covers a fumigated agricultural field with the multilayer film arranged so that said at least one barrier layer covers an area of the agricultural field to retain fumigant and said at least one soil fumigant permeable layer covers an area of the agricultural field to release fumigant.

* * * * *